United States Patent
Ramani et al.

(10) Patent No.: US 10,228,918 B2
(45) Date of Patent: Mar. 12, 2019

(54) PROCESSOR THAT DETECTS MEMORY ALIASING IN HARDWARE AND ASSURES CORRECT OPERATION WHEN MEMORY ALIASING OCCURS

(71) Applicant: International Business Machines Corporation, Armonk, NY (US)

(72) Inventors: Srinivasan Ramani, Cary, NC (US); Rohit Taneja, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/826,609

(22) Filed: Nov. 29, 2017

(65) Prior Publication Data

US 2018/0081647 A1    Mar. 22, 2018

Related U.S. Application Data

(62) Division of application No. 15/169,736, filed on Jun. 1, 2016.

(51) Int. Cl.
| | |
|---|---|
| *G06F 9/45* | (2006.01) |
| *G06F 8/41* | (2018.01) |
| *G06F 9/30* | (2018.01) |

(52) U.S. Cl.
CPC ............ *G06F 8/434* (2013.01); *G06F 8/45* (2013.01); *G06F 9/3016* (2013.01); *G06F 9/30043* (2013.01)

(58) Field of Classification Search
CPC .......... G06F 8/434; G06F 8/45; G06F 9/3016; G06F 9/30043
See application file for complete search history.

(56) References Cited

U.S. PATENT DOCUMENTS

| | | | |
|---|---|---|---|
| 5,517,657 | A | 5/1996 | Rodgers |
| 5,860,138 | A | 1/1999 | Engebretsen et al. |
| 5,892,936 | A | 4/1999 | Tran et al. |
| 6,158,048 | A | 12/2000 | Lueh et al. |
| 6,260,190 | B1 | 7/2001 | Ju |
| 7,856,624 | B2 | 12/2010 | Plum |
| 8,607,019 | B2 | 12/2013 | Chung |
| 9,152,417 | B2 | 10/2015 | Wang et al. |
| 9,411,964 | B1 | 8/2016 | Moritz et al. |
| 9,495,136 | B2 | 11/2016 | Schmidt |
| 2002/0156962 | A1* | 10/2002 | Chopra ............... G06F 9/30032 711/3 |

(Continued)

OTHER PUBLICATIONS

Title: Classifying Load and Store Instructions for Memory Renaming: author: Reinman et al, source:Published in the Proceedings of the International Conference on Supercomputing, dated: Jun. 1999.*

(Continued)

*Primary Examiner* — Chameli Das
(74) *Attorney, Agent, or Firm* — Martin & Associates, LLc; Derek P. Martin

(57) ABSTRACT

Processor hardware detects when memory aliasing occurs, and assures proper operation of the code even in the presence of memory aliasing. Because the hardware can detect and correct for memory aliasing, this allows a compiler to make optimizations such as register promotion even in regions of the code where memory aliasing can occur. The result is code that is more optimized and therefore runs faster.

1 Claim, 17 Drawing Sheets

(56) References Cited

U.S. PATENT DOCUMENTS

| | | |
|---|---|---|
| 2002/0166115 A1 | 11/2002 | Sastray |
| 2003/0074655 A1 | 4/2003 | Robison |
| 2003/0145190 A1 | 7/2003 | Faraboschi |
| 2004/0010675 A1 | 1/2004 | Moritz |
| 2004/0019884 A1 | 1/2004 | Haber et al. |
| 2005/0188172 A1 | 8/2005 | Lopez-Estrada |
| 2005/0257200 A1 | 11/2005 | Taylor |
| 2006/0130021 A1 | 6/2006 | Plum et al. |
| 2007/0198785 A1* | 8/2007 | Kogge .................. G06F 9/4843 711/154 |
| 2007/0283098 A1 | 12/2007 | O'Brien et al. |
| 2008/0082765 A1 | 4/2008 | Hily et al. |
| 2009/0199169 A1 | 8/2009 | Lin |
| 2010/0058034 A1 | 3/2010 | Zaks |
| 2010/0299657 A1 | 11/2010 | Barua et al. |
| 2011/0276791 A1 | 11/2011 | Chaudhry et al. |
| 2012/0198428 A1 | 8/2012 | Schmidt |
| 2012/0260072 A1 | 10/2012 | Wang et al. |
| 2013/0247014 A1 | 9/2013 | Farrell et al. |
| 2013/0283014 A1 | 10/2013 | Wang et al. |
| 2014/0281408 A1 | 9/2014 | Zeng |
| 2014/0281409 A1 | 9/2014 | Abdallah et al. |
| 2014/0281435 A1 | 9/2014 | Perkins et al. |
| 2015/0039861 A1 | 2/2015 | Rong et al. |
| 2015/0277975 A1 | 10/2015 | Kelm et al. |
| 2015/0278097 A1 | 10/2015 | Kelm et al. |
| 2015/0378731 A1 | 12/2015 | Lai et al. |
| 2016/0092234 A1 | 3/2016 | Vasudevan et al. |
| 2017/0083318 A1 | 3/2017 | Burger et al. |
| 2017/0185404 A1 | 6/2017 | Mekkat et al. |

OTHER PUBLICATIONS

Postiff et al., "The Store-Load Address Table and Speculative Register Promotion", 33rd Annual IEEE/ACM International Symposium on Microarchitecture, pp. 235-244, Dec. 2000.

Dietz et al., "CRegs: A New Kind of Memory for Referencing Arrays and Pointers", Proc. of Supercomputing '88pp. 360-367, Jan. 1988.

Nowakowski et al., "A CRegs Implementation Study Based on the MIPS-X RISC Processor", Intl. Conf. Computer Design, VLSI in Computers and Processors, pp. 558-563, Oct. 1992.

Dahl et al., "Reducing Memory Traffic with Cregs", Proc. of 27th Intl. Symp. Microarchitecture, pp. 100-104, Nov. 1994.

Lin et al., "Speculative register promotion using Advanced Load Address Table (ALAT)", Proc. of the International Synposium on Code Generation and Optimization: Feedback-directed Runtime Optimization (CGO '03), pp. 125-134, 2003.

Sethumadhavan et al., "Scalable Hardware Memory Disambiguation for High ILP Processors", 36th Annual International Symposium on Microarchitecture, 2003.

Castro et al., "Memory disambiguation hardware: a review", Invited paper, JCS&T, vol. 8, No. 3, pp. 132-138, Oct. 2008.

Sinharoy, et al., "IBM POWER8 processor core microarchitecture", IBM Journal of Research and Development, vol. 59, No. 1, pp. 2:1-2:21, Jan./Feb. 2015.

Kanter, David "Intel's Haswell CPU Microarchitecture", Real World Technologies, printed from http://www.realworldtech.com/haswell-cpu/5/, Nov. 13, 2012.

Lin et al., "A Compiler Framework for Speculative Optimizations," 2004.

POWER7 and POWER7+ Optimization and Tuning Guide, p. 121, IBM, Nov. 2012.

Ramani et al., "Processor That Detects Memory Aliasing in Hardware and Assures Correct Operation When Memory Aliasing Occurs", U.S. Appl. No. 15/169,736, filed Jun. 1, 2016.

Ramani et al., "Compiler That Performs Register Promotion Optimizations in Regions of Code Where Memory Aliasing May Occur", U.S. Appl. No. 15/169,737, filed Jun. 1, 2016.

Ramani et al., "Performing Register Promotion Optimizations in a Computer Program in Regions Where Memory Aliasing May Occur and Executing the Computer Program on Processor Hardware That Detects Memory Aliasing", U.S. Appl. No. 15/169,739, filed Jun. 1, 2016.

Ramani et al., "Processor That Includes a Special Store Instruction Used in Regions of a Computer Program Where Memory Aliasing May Occur", U.S. Appl. No. 15/169,743, filed Jun. 1, 2016.

Ramani et al., "Processor That Includes a Special Store Instruction Used in Regions of a Computer Program Where Memory Aliasing May Occur", U.S. Appl. No. 15/828,148, filed Nov. 30, 2017.

IBM, Appendix P—List of IBM Patents or Patent Applications Treated as Related, dated Feb. 1, 2018.

Ramani et al., "Processor That Detects Memory Aliasing in Hardware and Assures Correct Operation When Memory Aliasing Occurs", U.S. Appl. No. 16/146,140, filed Sep. 28, 2018.

Ramani et al., "Performing Register Promotion Optimizations in a Computer Program in Regions Where Memory Aliasing May Occur and Executing the Computer Program on Processor Hardware That Detects Memory Aliasing", U.S. Appl. No. 16/120,249, filed Sep. 1, 2018.

IBM, Appendix P—List of IBM Patents or Patent Applications Treated as Related, dated Oct. 1, 2018.

* cited by examiner

```
int p7_GMSV(const ESL_DSQ *dsq, int L, const P7_PROFILE *gm, P7_GMX *gx, float
nu, float *opt_sc)
{
  float **dp = gx->dp, *xmx = gx->xmx;
  int i, k;
  float tbmk = logf( 2.0f / ((float) gm->M * (float) (gm->M+1)));
  ...
  for (i = 1; i <= L; i++) {
  float const *rsc = gm->rsc[dsq[i]];
  ...
  for (k = 8*K + 1; k <= gm->M; k++)
    {
      (dp[(i)][(k) * 3 + p7G_M]) = (rsc[(k) * 2 + p7P_MSC]) + ((((dp[(i-1)][(k-1) * 3 +
p7G_M]))>((xmx[(i-1) * 5 + (p7G_B)]) + tbmk))?((dp[(i-1)]
[(k-1) * 3 + p7G_M])):((xmx[(i-1) * 5 + (p7G_B)]) + tbmk));
      (xmx[(i) * 5 + (p7G_E)]) = ((((xmx[(i) * 5 + (p7G_E)]))>((dp[(i)][(k) * 3 +    ——— 200
p7G_M])))?((xmx[(i) * 5 + (p7G_E)])):((dp[(i)][(k) * 3 + p7G_M])));
    }
  ...
}
```

FIG. 2

```
int p7_GMSV(const ESL_DSQ *dsq, int L, const P7_PROFILE *gm, P7_GMX *gx, float
nu, float *opt_sc)
{
  float f2, f0, f1;
  f1 = xmx[(i-1) * 5 + (p7G_B)] + tbmk; f2 = xmx[(i) * 5 + (p7G_E)];
  ...
  for (i = 1; i <= L; i++) {
  float const *rsc = gm->rsc[dsq[i]];
  ...
  for (k = 8*K + 1; k <= gm->M; k++)
    {
      f0 = rsc[k * 2 + p7P_MSC];
      dp[i][k * 3 + p7G_M] = f0 + ((dp[(i-1)][(k-1) * 3 + p7G_M ] > f1 )?dp[(i-1)][(k-1) * 3 +
p7G_M] : f1 );
      f2 = ( f2 >dp[i][k * 3 + p7G_M])? f2 : dp[i][k * 3 + p7G_M];    ——— 300
    }
xmx[i * 5] = f2;    ——— 310
}
```

FIG. 3

```
            While () {
1910 ——     Load R5, addr1  ◄——  Restore of R5 in epilog is suppressed
            Add R5, R5, 1                due to this load
1920 ——     Spl.Store R5, addr1  ◄——  Save of R5 in prolog is suppressed
            Foo();                       due to this special store
            }
```

PROCESSOR THAT DETECTS MEMORY ALIASING IN HARDWARE AND ASSURES CORRECT OPERATION WHEN MEMORY ALIASING OCCURS

BACKGROUND

1. Technical Field

This disclosure generally relates to computer systems, and more specifically relates to memory aliasing in computer systems.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

Memory aliasing can occur when two pointers in a computer program refer to the same memory address at some point in time during execution. Compilers that use pointers to dynamically allocated memory often cannot rule out aliasing of memory addresses derived from different pointers. Register promotion is a very useful compiler optimization that improves performance, for example in inner loops, by using registers instead of memory addresses to store intermediate values. However, if values are stored and loaded using pointers that have an address range cannot be determined by static compiler analysis, compilers have to generate corresponding load and store instructions without doing optimization such as register promotion due to the risk of memory aliasing occurring. As a result, when known compilers cannot rule out memory aliasing for a particular region of code, register promotion for that region of code is not done by the compiler. The result is a computer program generated by the compiler that is not as optimized as it could otherwise be due to the risk of memory aliasing.

BRIEF SUMMARY

Processor hardware detects when memory aliasing occurs, and assures proper operation of the code even in the presence of memory aliasing. Because the hardware can detect and correct for memory aliasing, this allows a compiler to make optimizations such as register promotion even in regions of the code where memory aliasing can occur. The result is code that is more optimized and therefore runs faster.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is sample pseudo-code of a function derived from the source code for the HMMER program, publicly available at hmmer.org;

FIG. 3 is the sample pseudo-code in FIG. 2 after register promotion optimization has been performed by a compiler;

Figure 21:
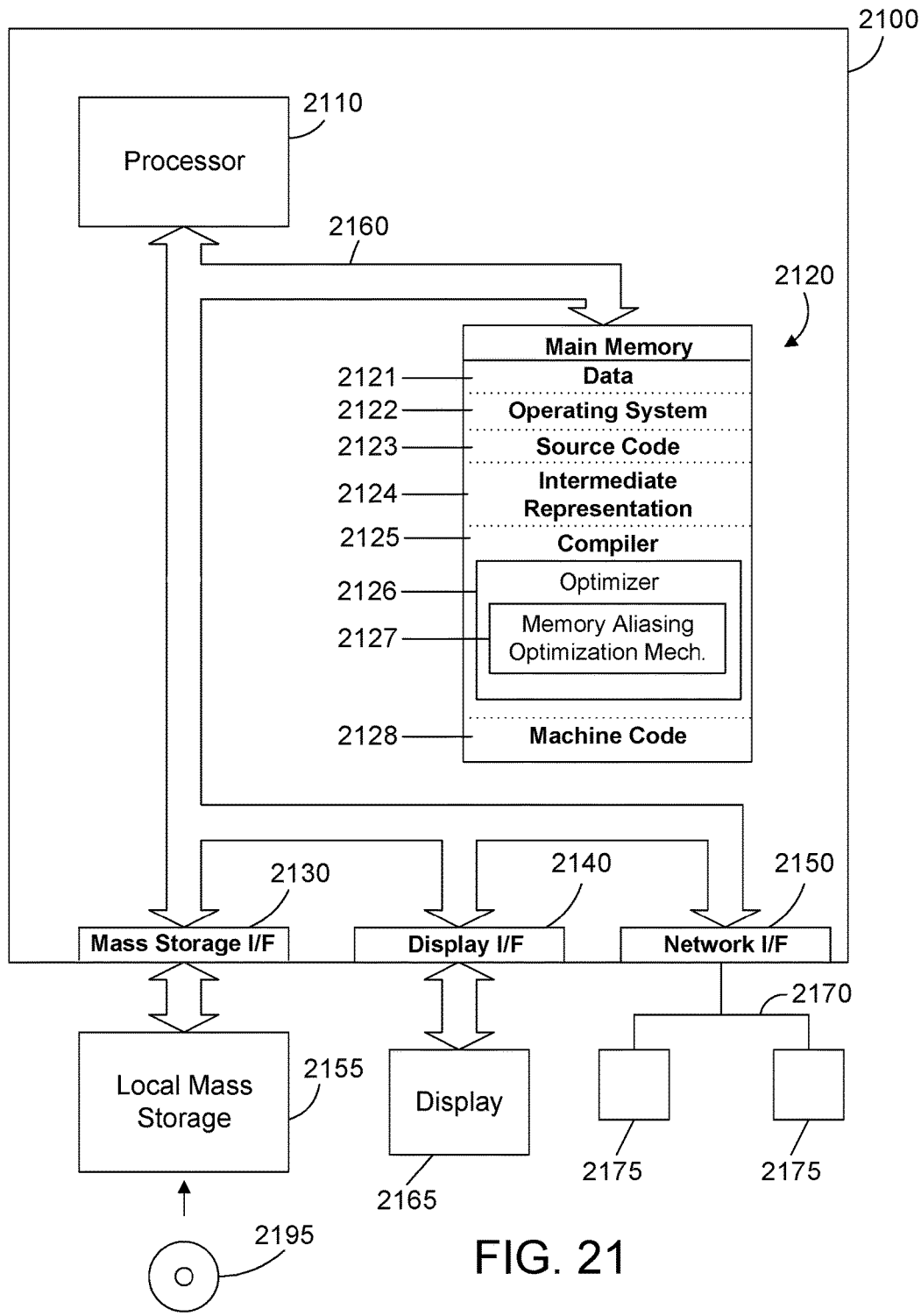
Figure 22:
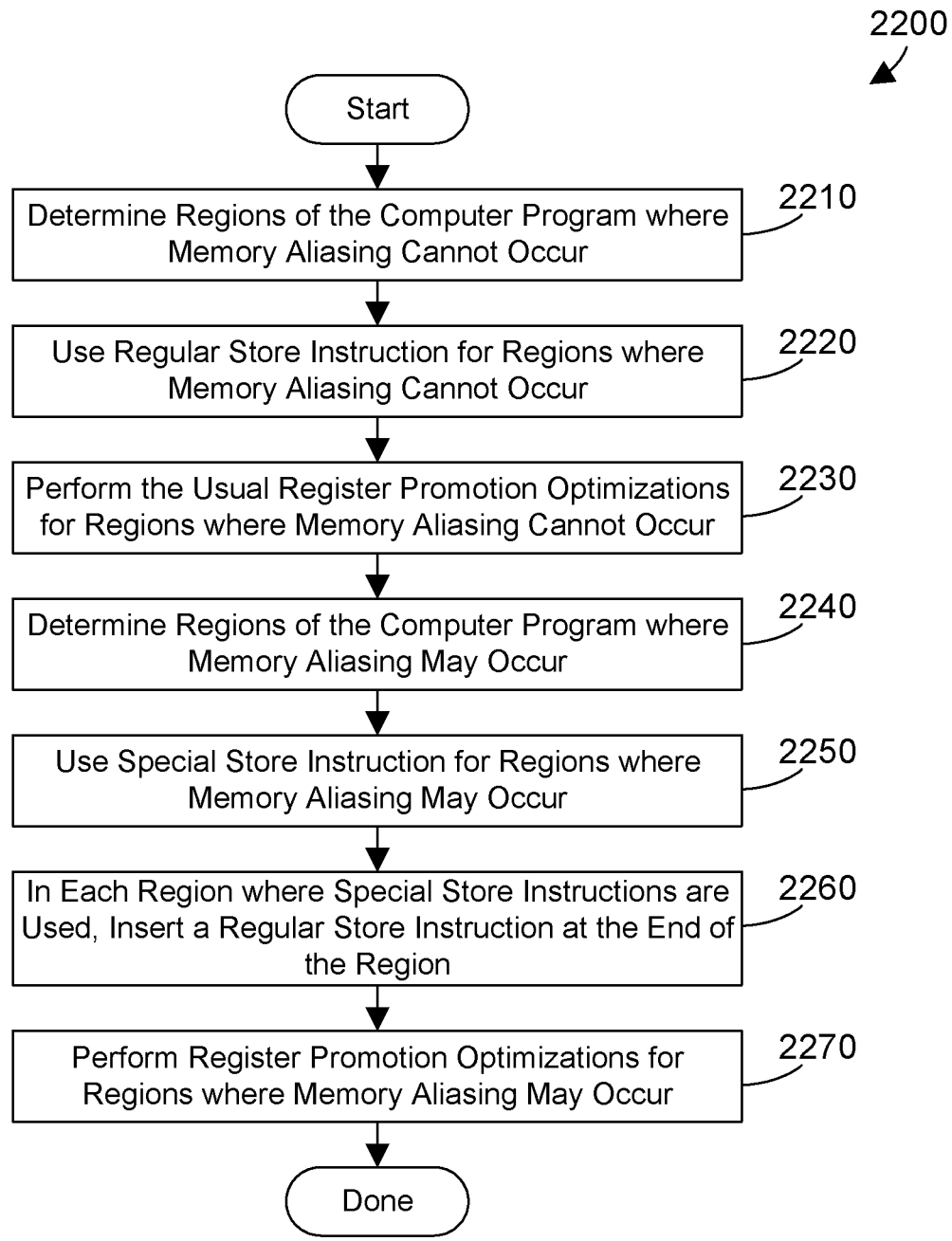

FIG. 21 is a block diagram of an apparatus that includes a compiler that has a memory aliasing optimization mechanism as described and claimed herein; and FIG. 22 is a flow diagram of a method for a compiler to perform register promotion optimizations in regions where memory aliasing cannot occur using a regular store instruction and in regions where memory aliasing may occur using a special store instruction.

DETAILED DESCRIPTION

A processor as disclosed and claimed herein includes hardware that detects when memory aliasing occurs, and assures proper operation of the code even in the presence of memory aliasing. Because the hardware can detect and correct for memory aliasing, this allows a compiler to make optimizations such as register promotion even in regions of the code where memory aliasing can occur. The result is code that is more optimized and therefore runs faster.

FIG. 2 shows a snippet of pseudo-code for a loop derived from the source code in the HMMER program, publicly available at hmmer.org. The instruction shown at 200 in FIG. 2 would be a candidate for register promotion optimization by a compiler. FIG. 3 shows how the store to the xmx array can be promoted to store to a local variable inside the inner loop. The local variable is stored in a processor register. The register promotion optimization for the instruction 200 in FIG. 2 is shown by the instructions 300 and 310 in FIG. 3.

Figure 4:
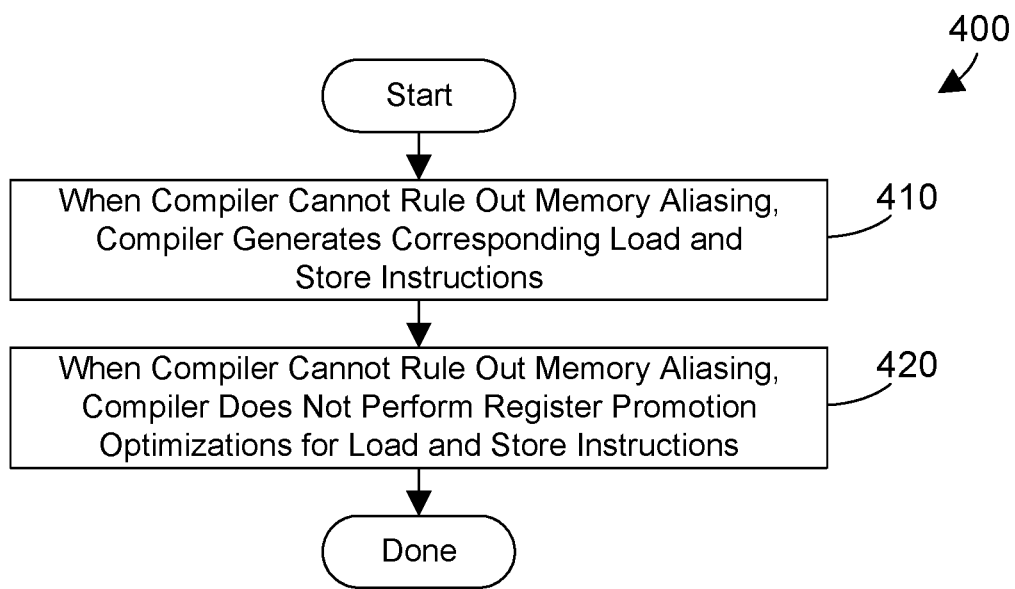
FIG. 4 is a flow diagram of a method for known compilers that does not perform register promotion in regions of the code where memory aliasing can occur.

In the prior art, a compiler will only do register promotion optimizations, such as that shown in FIG. 3, when it is known that there is no possibility for the dp, rsc and xmx arrays to result in memory aliasing. FIG. 4 shows a method 400 that represents the function of known compilers. When a compiler cannot rule out memory aliasing, the compiler generates corresponding load and store instructions (step 410), and does not perform register promotion optimizations for the load and store instructions (step 420). Known compilers thus take a conservative approach by refusing to perform register promotion optimizations in regions of the code where memory aliasing could occur.

Figure 1:
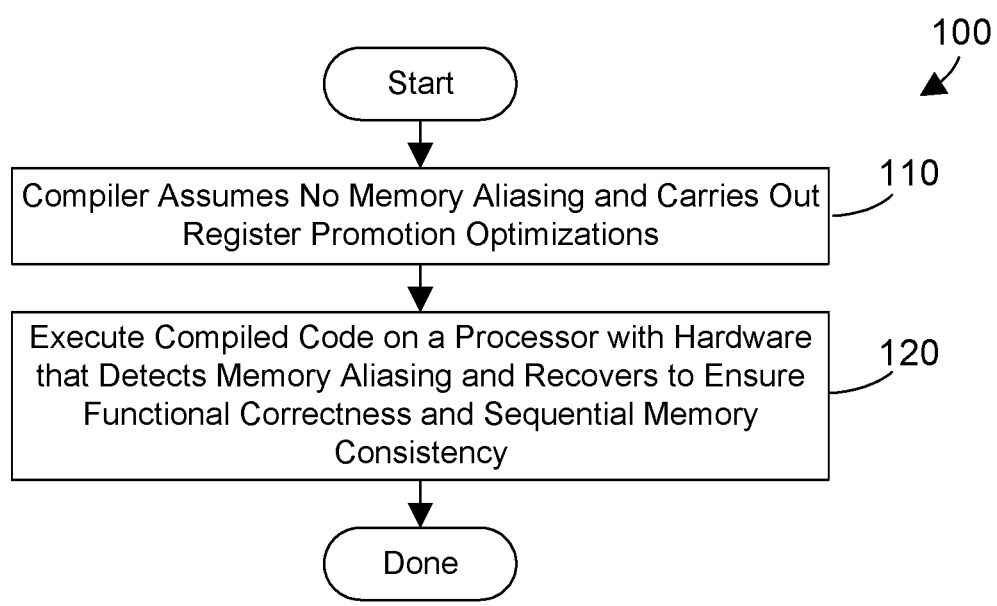
FIG. 1 is a method for generating and executing optimized code even for regions where memory aliasing can occur.

The processor hardware and compiler herein allow register promotion optimizations such as that shown in FIG. 3 to be made by a compiler even when memory aliasing is possible because the processor hardware can detect memory aliasing and assure proper operation of the code even when memory aliasing occurs. Referring to FIG. 1, in a method 100 according to the disclosure herein, a compiler assumes no memory aliasing and carries out register promotion optimizations (step 110). The compiled code is then executed on a processor with hardware that detects memory aliasing and recovers to ensure functional correctness and sequential memory consistency (step 120). Because memory aliasing is detected and recovered from in the processor hardware, a compiler can make aggressive optimizations even in regions where memory aliasing could occur, thereby improving the performance of the code in many places when compared to code produced by known compilers.

Figure 5:
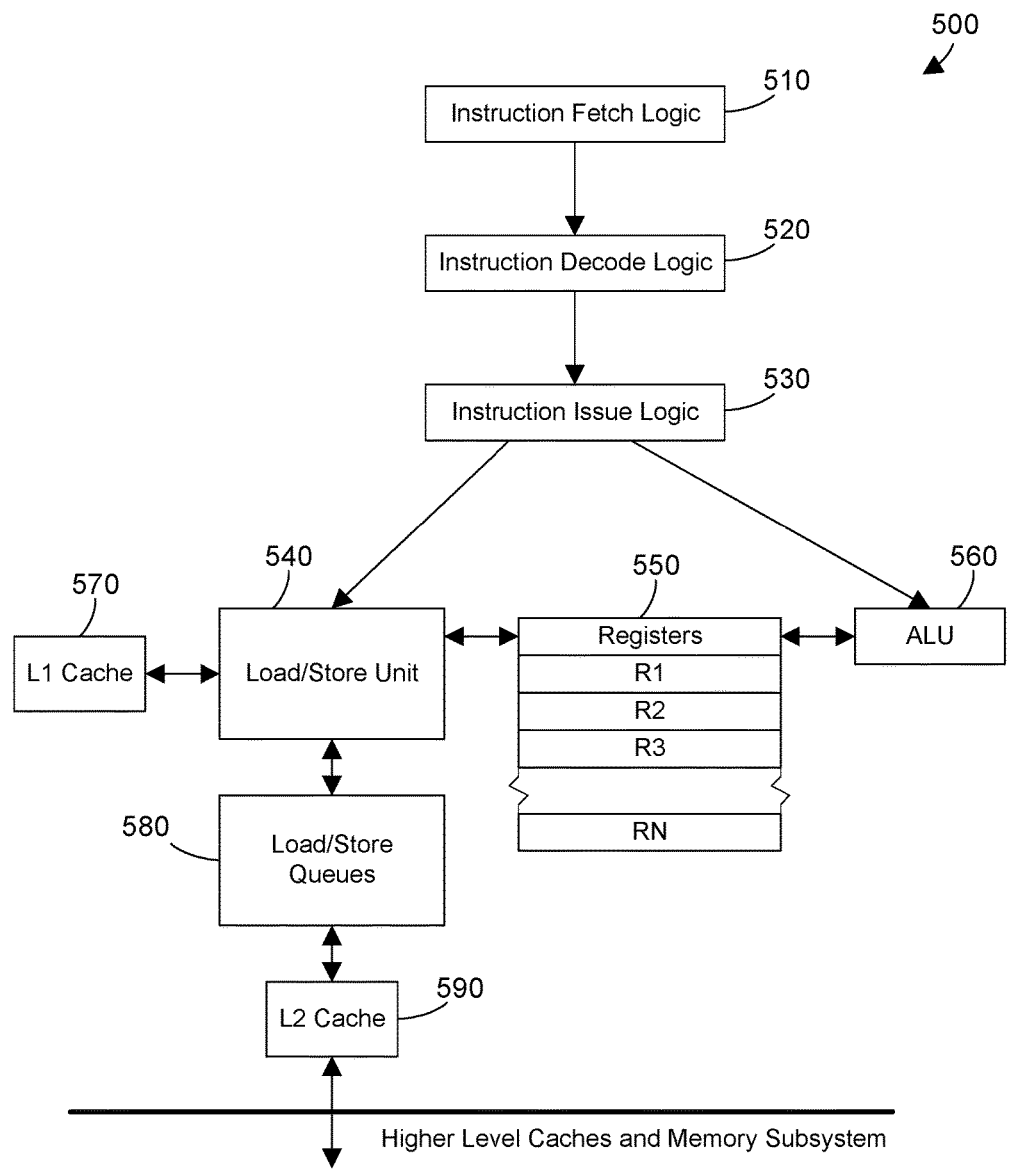
FIG. 5 is a block diagram of typical hardware in known processors.

Referring to FIG. 5, some hardware elements of a known processor 500 are shown. Instruction fetch logic 510 fetches the next instruction to be executed. Instruction decode logic 520 decodes the instruction to be executed. Instruction issue logic 530 determines when and how to issue the instruction to the Arithmetic Logic Unit (ALU) 560 and/or the load/store unit 540, depending on the type of instruction being executed. The processor may have multiple instances of the ALU and Load/Store Unit, and may have dedicated units for Integer, Floating Point, Vector, Branch, Condition processing. These are not explicitly shown but are considered embodiments of processor designs within the scope of the disclosure and claims herein. The load/store unit 540 stores to and reads from a level 1 (L1) cache 570, and also stores to and reads from load/store queues 580. Data in the load/store queues 580 is propagated to a level 2 (L2) cache 590, then on to higher level caches and the memory subsystem. The queues in the load/store unit 540 are used by the processor to ensure that loads and stores complete in proper program order, thereby maintaining sequential memory consistency. The load/store unit 540 and ALU 560 can write data to and read data from the processor registers 550.

Figure 6:
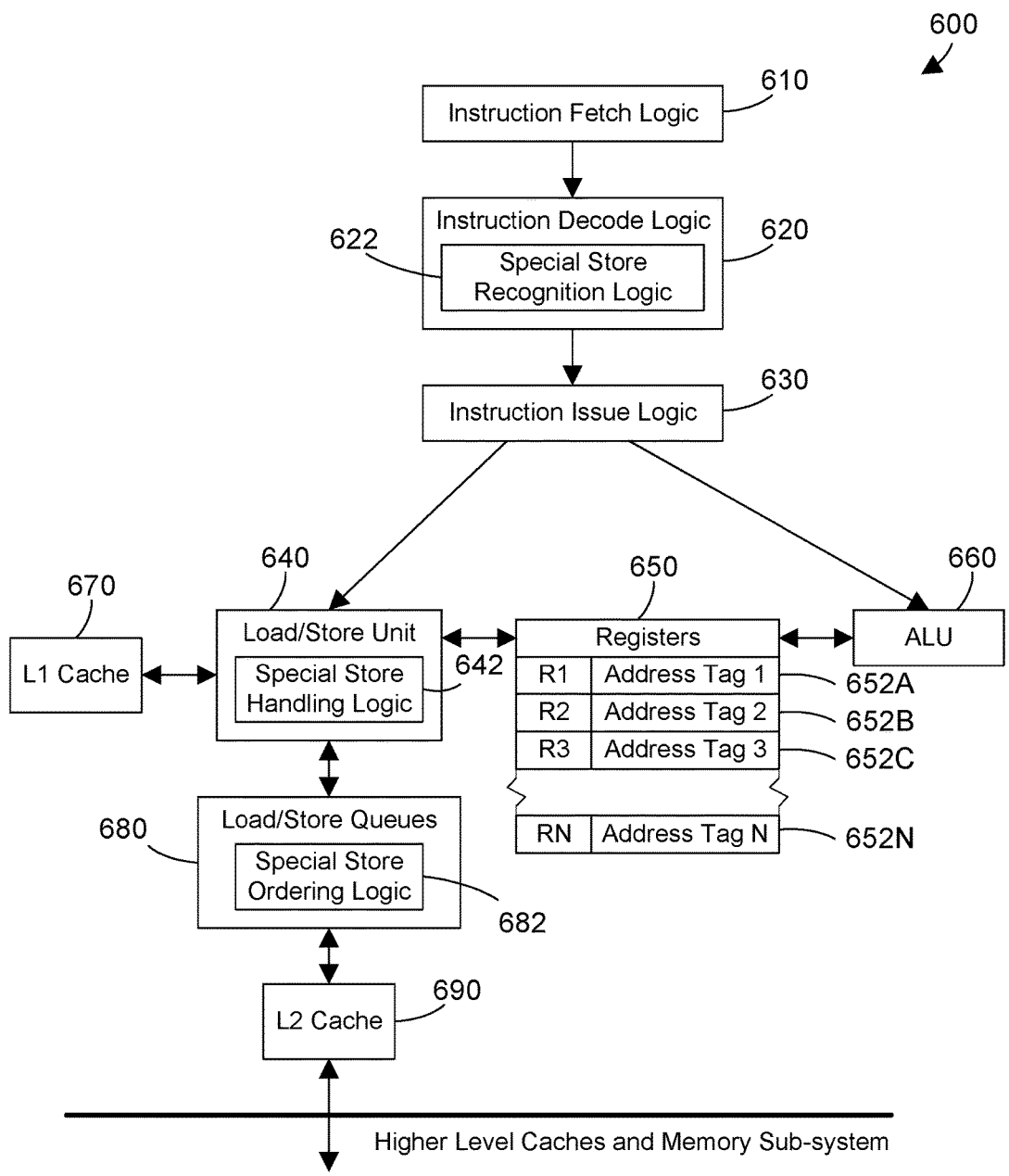
FIG. 6 is a block diagram showing hardware in a processor that detects and corrects memory aliasing.

Referring to FIG. 6, some hardware elements of a processor 600 detects memory aliasing and performs steps to correct for memory aliasing. The instruction fetch logic 610 fetches the next instruction to be executed. Instruction decode logic 620 decodes the instruction to be executed. Instruction decode logic 620 includes logic 622 to recognize special store instructions that are used by the compiler in regions of code where memory aliasing may occur. Instruction issue logic 630 determines when and how to issue the instruction to the Arithmetic Logic Unit (ALU) 660 and/or the load/store unit 640, depending on the type of instruction being executed. The load/store unit 640 stores to and reads from a L1 cache 670, and also stores to and reads from load/store queues 680. The load/store unit 640 includes special store handling logic 642 that processes special store instructions differently than traditional store instructions. The load/store queues 680 include special store ordering logic 682 to assure the special stores are processed correctly, even when memory aliasing occurs. The special store ordering logic 682 does special handling of loads that had their data sent from a register because of an address tag match, as discussed in more detail below. Data in the load/store queues 680 is propagated to a L2 cache 690, then on to higher level caches and the memory subsystem. The queues in the load/store unit 640 are used by the processor to ensure that loads and stores complete in proper program order, thereby maintaining sequential memory consistency. The load/store unit 640 and ALU 660 can write data to and read data from the processor registers 650. Note the registers 650 each have a corresponding address tag. Thus, register R1 has a corresponding Address Tag 1 652A; register R2 has a corresponding Address Tag 2 652B; register R3 has a corresponding Address Tag 3 652C; and so on through register RN, which has a corresponding Address Tag N 652N. The address tags for the registers are used by the processor 600 to assure correct operation when memory aliasing occurs, as discussed in more detail below.

Figure 7:
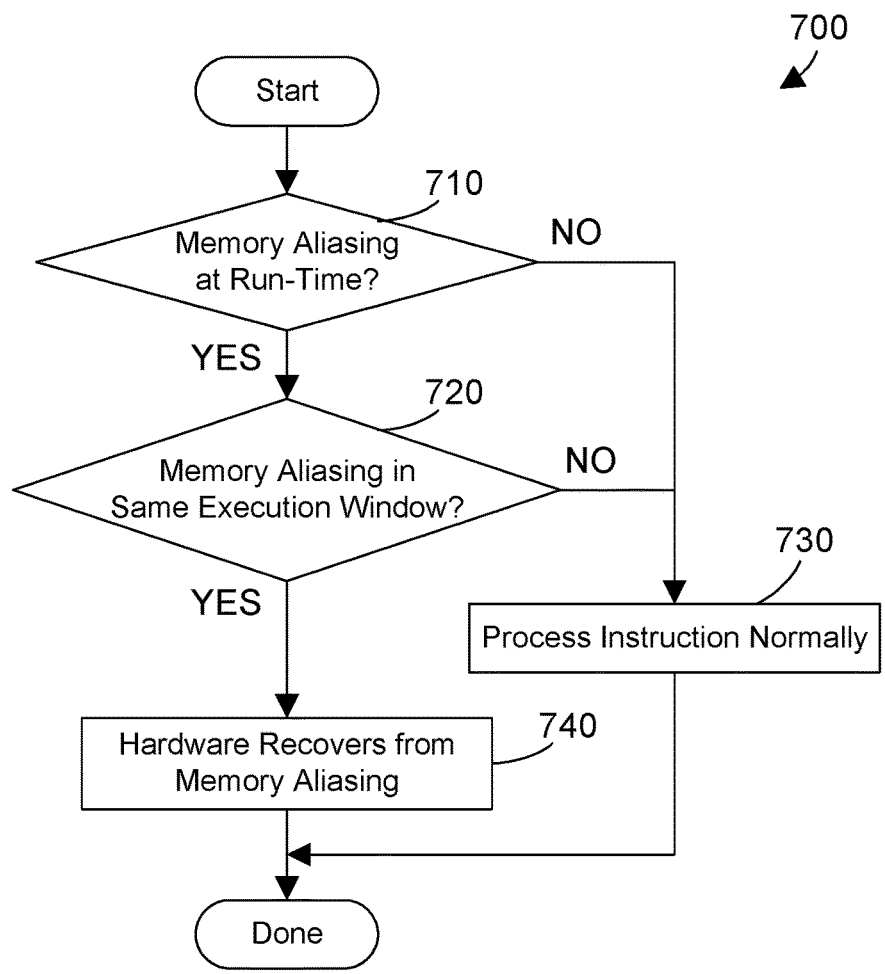
FIG. 7 is a flow diagram of a method for the processor hardware in FIG. 6 to process instructions.

FIG. 7 shows a method 700 that provides a high-level view of the function of processor 600 in FIG. 6. When there is no memory aliasing at run-time (step 710=NO), the instruction is processed normally (step 730). When there is memory aliasing at run-time (step 710=YES), but the memory aliasing is not in the same execution window (step 720=NO), the instruction is processed normally (step 730). When there is memory aliasing at run-time (step 710=YES) and the memory aliasing occurs in the same execution window (step 720=YES), the hardware recovers from the memory aliasing (step 740). Method 700 is then done.

Figure 8:
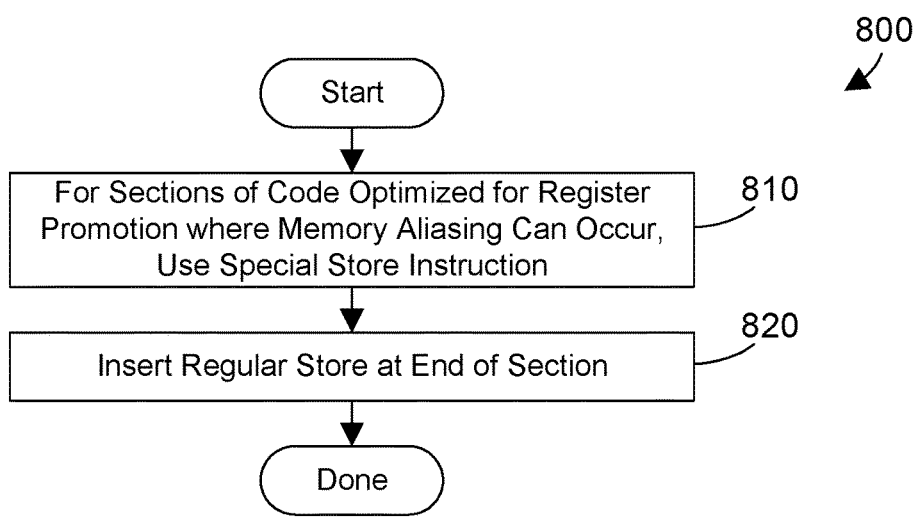
FIG. 8 is a flow diagram of a method for a compiler to use special store instructions in regions where memory aliasing can occur.

FIG. 8 shows a method 800 for a compiler to perform register promotion optimizations even in regions of code where memory aliasing may occur. Method 800 is one suitable implementation for step 110 in FIG. 1. For sections of code optimized for register promotion where memory aliasing can occur, the compiler uses a special store instruction (step 810). This special store instruction is separate and distinct from normal store instructions, and constitutes a new instruction in the instruction set for the processor. In the most preferred implementation, the special store instruction is used only when memory aliasing can occur. It is this special store instruction that triggers the processor hardware to determine when memory aliasing occurs, and to make the appropriate corrections to assure proper operation when memory aliasing occurs. A regular store instruction is inserted at the end of the section (step 820). Method 800 shows how a region of code where memory aliasing may occur can still be optimized by a compiler to achieve significant runtime improvement in performance when the processor includes the hardware for detecting and correcting for memory aliasing, as described in detail herein.

Figure 9:
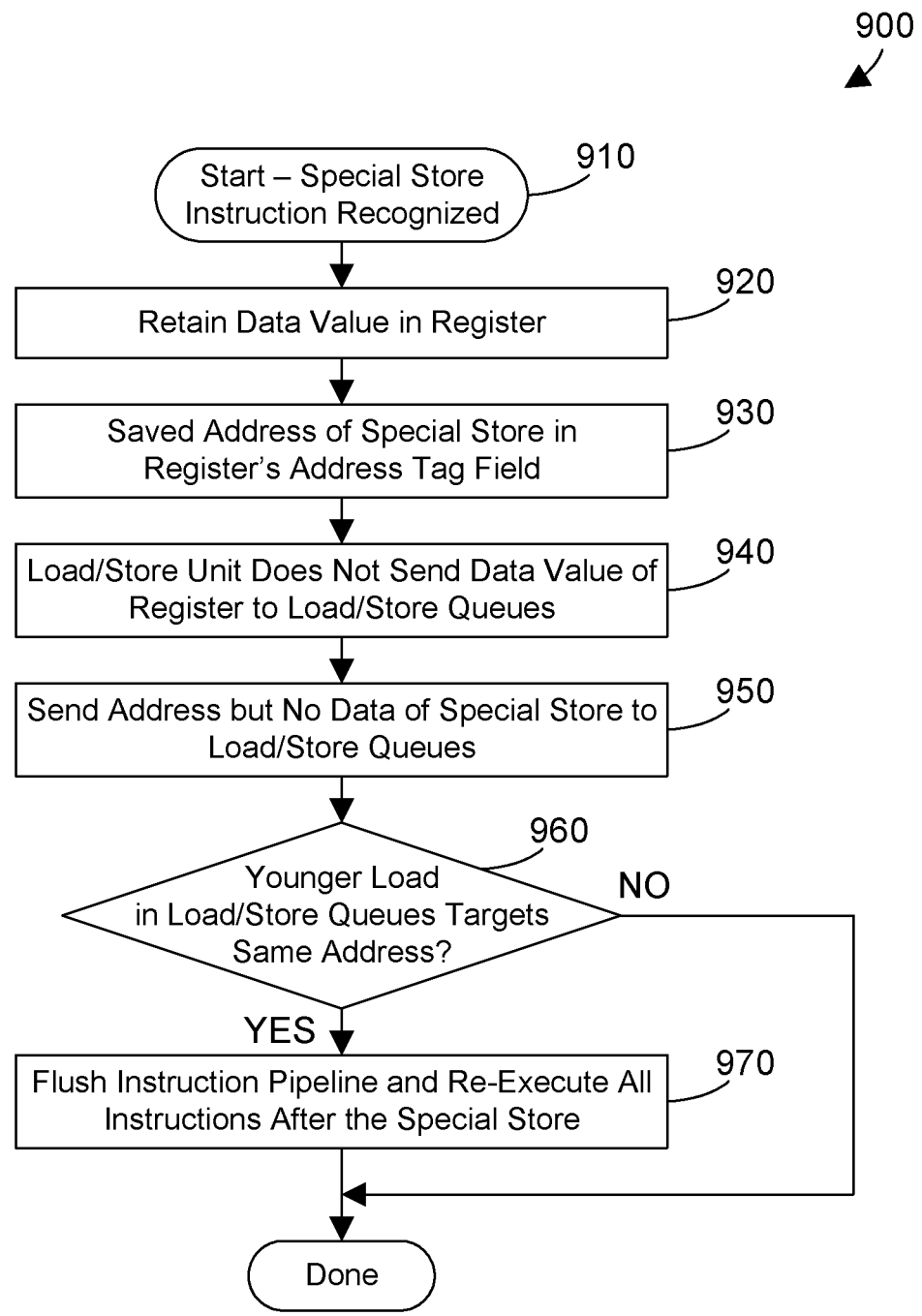
FIG. 9 is a flow diagram of a method for the processor hardware in FIG. 6 to process a special store instruction.

FIG. 9 shows a flow diagram of a method 900 for a processor to process special store instructions. Method 900 could be performed, for example, by the processor 600 shown in FIG. 6. Method 900 begins when a special store instruction is recognized (step 910). For example, a special store instruction is recognized by the special store recognition logic 622 shown in FIG. 6. The data value is retained in a register (step 920). The address of the special store is retained in the register's corresponding address tag field (step 930). Unlike normal stores, the load/store unit does not send the data value of the register to the load/store queues (step 940). Thus, in referring to FIG. 6, when the load/store unit 640 receives a normal store, the data value is retained in a register and is also sent to the load/store queues 680. However, when the load/store unit 640 receives a special store, the special store handling logic 642 retains the data value in a register, writes the address of the special store to the corresponding address tag field of the register, but does not send the data value to the load/store queues 680. The address but not the data of the special store is sent to the load/store queues (step 950). Step 950 is preferably performed by the special store handling logic 642 in FIG. 6. When there is no younger load in the load/store queues that targets the same address (step 960=NO), method 900 is done. When there is a younger load in the load/store queues that targets the same address (step 960=YES), the instruction pipeline is flushed and all instructions after the special store are re-executed (step 970). The flushing of the instruction pipeline is preferably performed by the instruction issue logic 630 in FIG. 6. Method 900 is then done.

Figure 10:
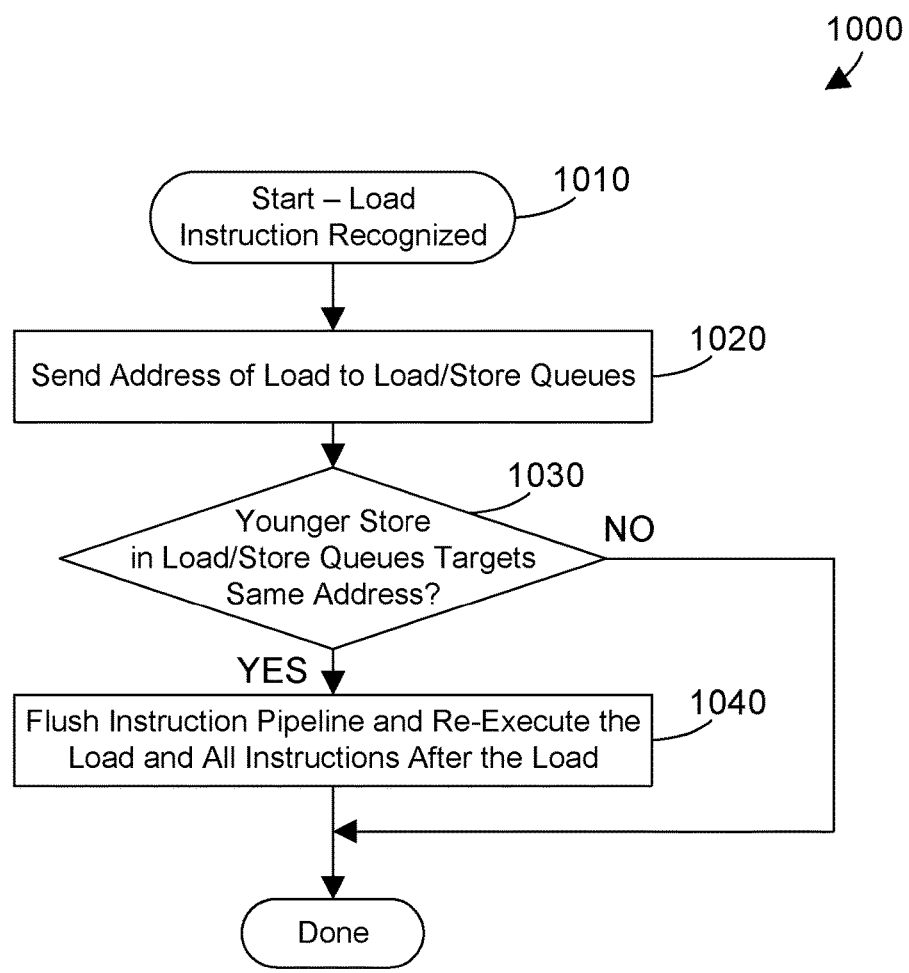
FIG. 10 is a flow diagram of a method for the processor hardware in FIG. 6 to process a load instruction.

FIG. 10 shows a flow diagram of a method 1000 for a processor to process load instructions. Method 1000 begins when a load instruction is recognized (step 1010). The address of the load is sent to the load/store queues (step 1020). When there is no younger store in the load/store queues that targets the same address as the load (step 1030=NO), method 1000 is done. When there is a younger store in the load/store queues that targets the same address as the load (step 1030=YES), the instruction pipeline is flushed so the load and all instructions after the load are re-executed (step 1040). Method 1000 is then done.

Methods 900 and 1000 assure correct execution even when memory aliasing occurs at run-time, even in a processor that performs out-of-order execution of instructions. This is possible by tracking the data destination addresses of store instructions using the address tag fields, as shown in FIG. 6, and sending the address but not data to the load/store queues. The hardware in processor 600 in FIG. 6 and corresponding method 900 in FIG. 9 allow a compiler to make aggressive register promotion optimizations in the code without regard to memory aliasing. In other words, even in regions of the code where memory aliasing can occur, the compiler may still make register promotion optimizations, as discussed above with respect to step 110 in FIG. 1 and method 800 in FIG. 8, because the hardware can detect and fix all issues with respect to memory aliasing at run-time.

The flushing of the instruction pipeline in step 970 in FIG. 9 and step 1040 in FIG. 10 creates inefficiencies because many of the instructions in the instruction pipeline must be re-executed when a flush occurs. The inefficiencies caused by flushing the instruction pipeline can be somewhat mitigated, as shown in method 1100 in FIG. 11. The processor hardware monitors which load instructions are frequently flushed due to special store instructions that cause them to be flushed, and likewise monitors which special store instructions are frequently flushed due to a load instruction that causes them to be flushed. The load instructions that are flushed frequently are tagged with a dependency on the special store instruction that flushes them (step 1110). In similar fashion, the special store instructions that are flushed frequently are tagged with a dependency on the load instruction that flushes them (step 1120). These dependencies could be tracked, for example, by the instruction issue logic 630 shown in FIG. 6.

Figure 11:
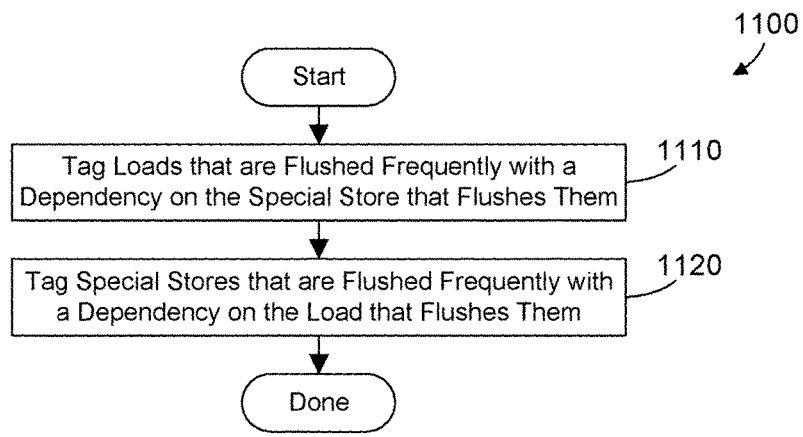
FIG. 11 is a flow diagram of a method for tagging instructions that are flushed frequently with a dependency that improves performance of the code by reducing the number of flushes.
Figure 12:
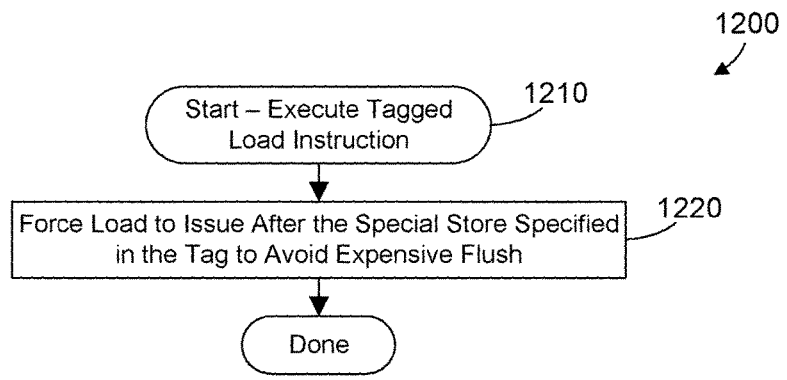
FIG. 12 is a flow diagram of a method for executing a tagged load instruction.
Figure 13:
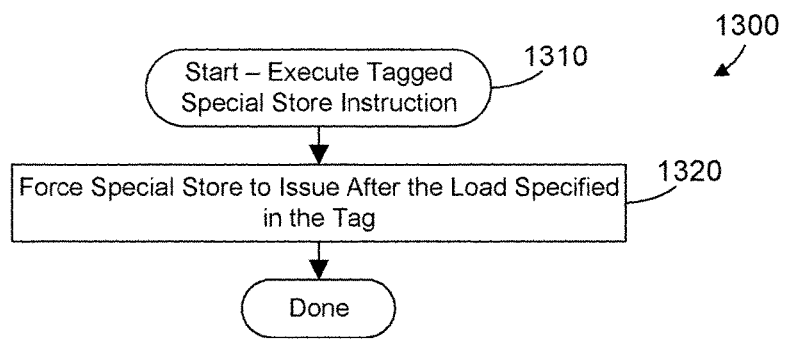
FIG. 13 is a flow diagram of a method for executing a tagged special store instruction.

Method 1200 in FIG. 12 begins when a tagged load instruction is executed (step 1210). The load is forced to issue after the special store specified in the tag to avoid the expensive flush (step 1220). Method 1300 in FIG. 13 begins when a tagged special store instruction is executed (step 1310). The special store is forced to issue after the load specified in the tag to avoid the expensive flush (step 1320). Thus, load instructions and special store instructions that are tagged as indicated in FIG. 11 are processed differently than load instructions and special store instructions that are not tagged. The tagging of the instructions in FIG. 11 allows the processor to perform in-order processing of instructions to avoid the possibility of a flush for those instructions that caused flushes in the past. The result is improved performance in executing the code.

Figure 14:
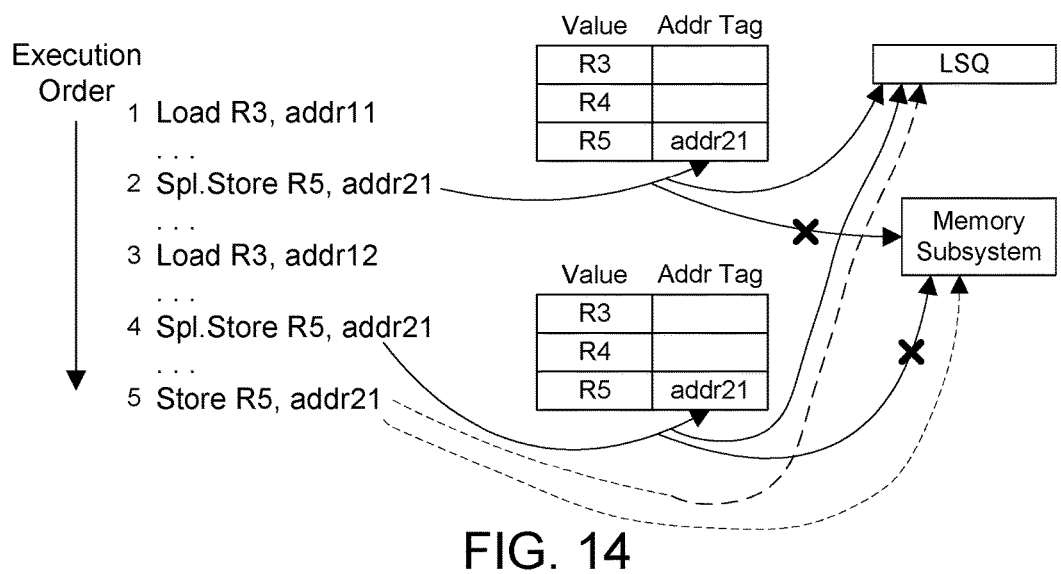
FIG. 14 is a block showing processing of instructions where no memory aliasing occurs.

Some specific examples are now given in FIGS. 14-17 to illustrate the concepts discussed generally above. The "special store" instruction is denoted in these examples as Spl.Store, as compared to a normal store which is shown as Store. Note that any suitable syntax or designation could be used to distinguish a special store instruction from a regular store instruction. When the special store at 2 is executed, the value is in register R5 with the address of the special store instruction addr21 stored to the address tag of register R5, as shown in FIG. 14. The numbers next to the instructions in FIGS. 14-17 represent the program order. The value of R5 is not sent to the load/store queues (LSQ), but the address alone is sent to the LSQ so that a load that executes later can detect if this special store is younger, but executed before it. If another register was previously tagged with the same address in its address tag, the address tag of the other register is reset to reflect that this latest special store's source register and its address tag take precedence. The example in FIG. 14 is one where no memory aliasing occurs. At the end of the code section where the register promotion optimization can end, such as at the end of a loop, the compiler inserts a regular store as shown at 5 in FIG. 14 to send the store on to the cache/memory subsystem and to clear the address tag field. This store 5 in FIG. 14 corresponds to the store inserted in step 820 in FIG. 8. Note the data from the regular store at 5 in FIG. 14 is sent both to the LSQ and to the memory subsystem, as shown by the dotted lines.

Figure 15:
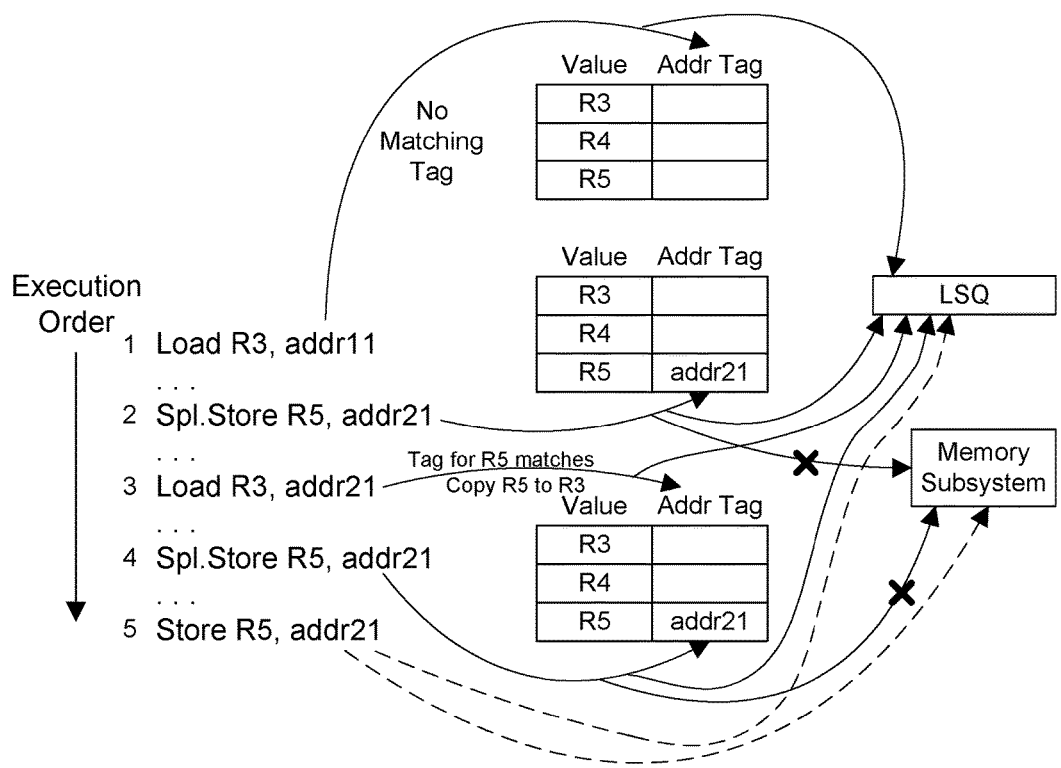
FIG. 15 is a block showing processing of instructions where memory aliasing occurs.

FIG. 15 shows another example where memory aliasing is detected and handled by the processor hardware to assure correct operation. The load instruction at 1 is executed, and there is no matching address tag in the registers, so this request is sent to the LSQ. When the special store is executed at 2, the value is in register R5 with the corresponding address addr21 being stored in the corresponding address tag field of register R5, as shown. The address, but not data, is sent to LSQ, and neither the address nor the data are sent to the memory subsystem, as indicated by the "X" for the special store instruction executed at 2 for the memory subsystem. When a younger load is executed later, its data address is matched with the address tag fields of registers that could have values from a previous instruction. When there is a match, the data is forwarded to the load from the matching register without involvement of the LSQ. Thus, when the load instruction at 3 in FIG. 15 is executed, because the tag for R5 matches the address of the load, the data in R5 is copied to R3. A load that has its data forwarded from a tagged register because its address matched an address tag in a register also sends the address to the LSQ, but the address is not sent to the memory subsystem. This is to help detect cases when a younger special store executes ahead of a load. When the loop is done, a regular store command at 5 is executed to forward the address and data to the memory subsystem and clears the address tag field of the register R5. The data from the regular store at 5 in FIG. 15 is sent both to the LSQ and to the memory subsystem, as shown by the dotted lines.

Figure 16:
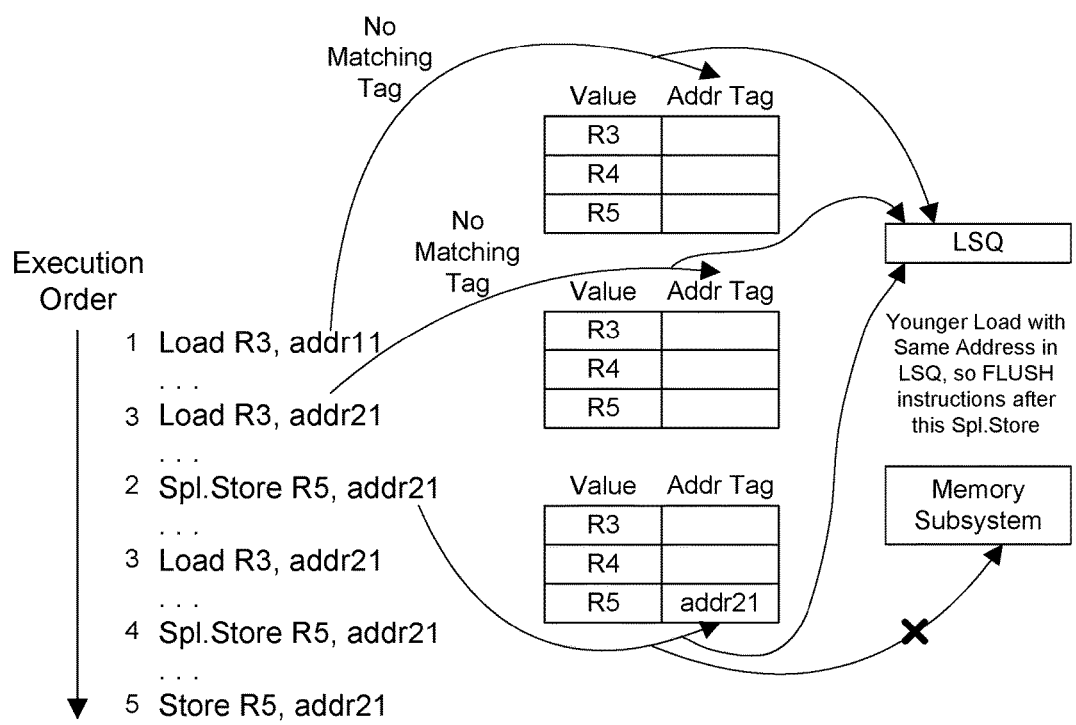
FIG. 16 is a block showing processing of instructions in a first case where memory aliasing occurs and the processor hardware recovers from an out of order load execution.

FIG. 16 illustrates what happens in a first case when memory aliasing occurs with an out-of-order load execution. The first load instruction at 1 is executed. There are no matching address tags for the registers, so the address is forwarded to the LSQ. We assume the next instruction executed is the load instruction at 3 that follows the load instruction at 1. Like the first load instruction, there are no matching address tags for the registers, so the address is forwarded to the LSQ. The special store at 2 is then executed. A check is made in the LSQ for a younger load with the same address. There is match in the LSQ of a younger load with the same address, so the instruction pipeline after the special store is flushed. The data is in register R5 and the address addr21 is stored to the address tag field for register R5, and the address but not data is forwarded to the LSQ. The instruction that was executed previously at 3 is thus re-executed at 3 after the special store instruction to provide in-order execution of these two instructions, and execution continues. FIG. 16 thus illustrates how the hardware handles the situation when a special store instruction is executed after a younger load to the same address, which is a case of memory aliasing. Note the dotted lines from the regular store instruction at 5 are not shown in FIG. 16 to avoid cluttering the drawing, but are understood to be present similar to FIGS. 14 and 15.

Figure 17:
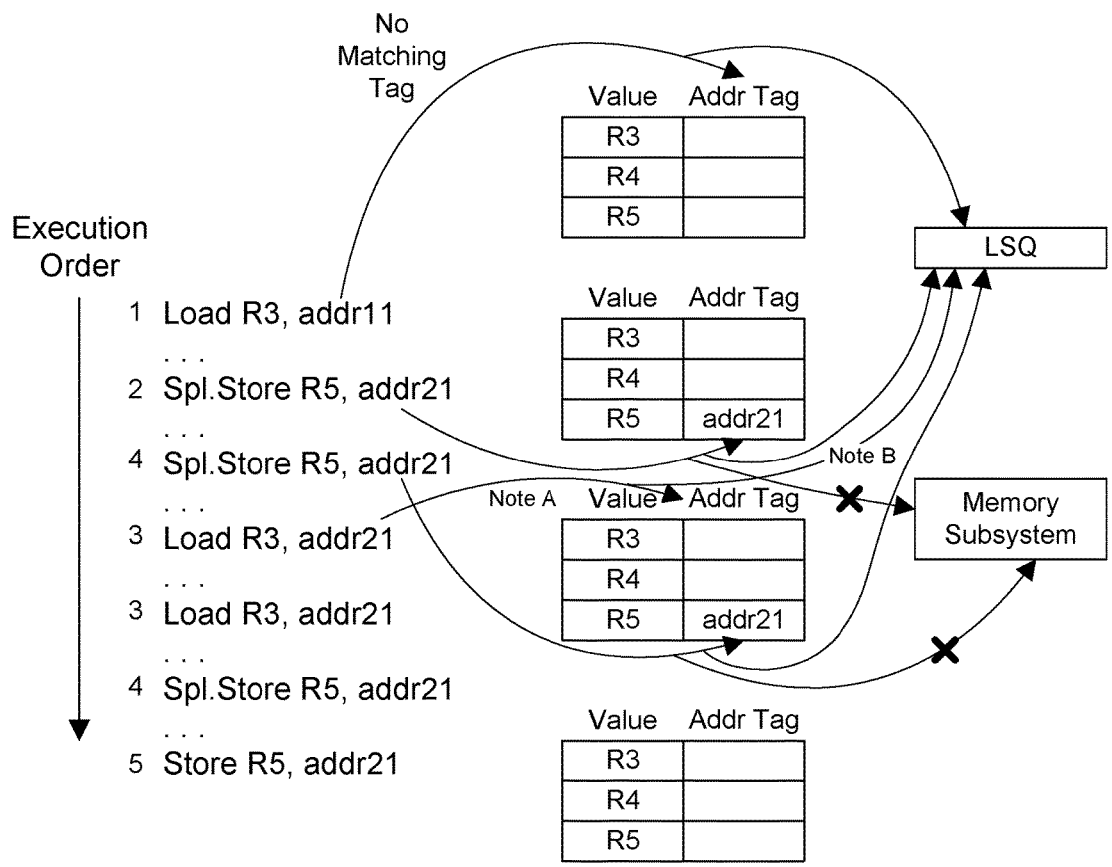
FIG. 17 is a block showing processing of instructions in a second case where memory aliasing occurs and the processor hardware recovers from an out of order special store execution.

FIG. 17 illustrates what happens in a second case when memory aliasing occurs with an out-of-order special store execution. The load instruction at 1 is executed, there is no match in the address tag fields, so the address is forwarded to the LSQ. The special store at 2 is then executed, which results in the value being retained in register R5, the address addr21 being stored to the address tag for register R5, and the address but not data being forwarded to the LSQ, with neither address nor data being forwarded to the memory subsystem. Next we assume a younger special store at 4 executes ahead of the load at 3. In processing the load, a check is made in the LSQ for a younger store to the same address. There is a match, so the address tag field of register R5 is cleared, and a flush is done of all instructions including and following the load instruction. The flush causes the load instruction to be re-executed at 3, followed by the execution of the special store at 4 and the regular store at 5. Note the dotted lines from the regular store instruction at 5 are not shown in FIG. 17 to avoid cluttering the drawing, but are understood to be present similar to FIGS. 14 and 15.

Figures 18, 19:
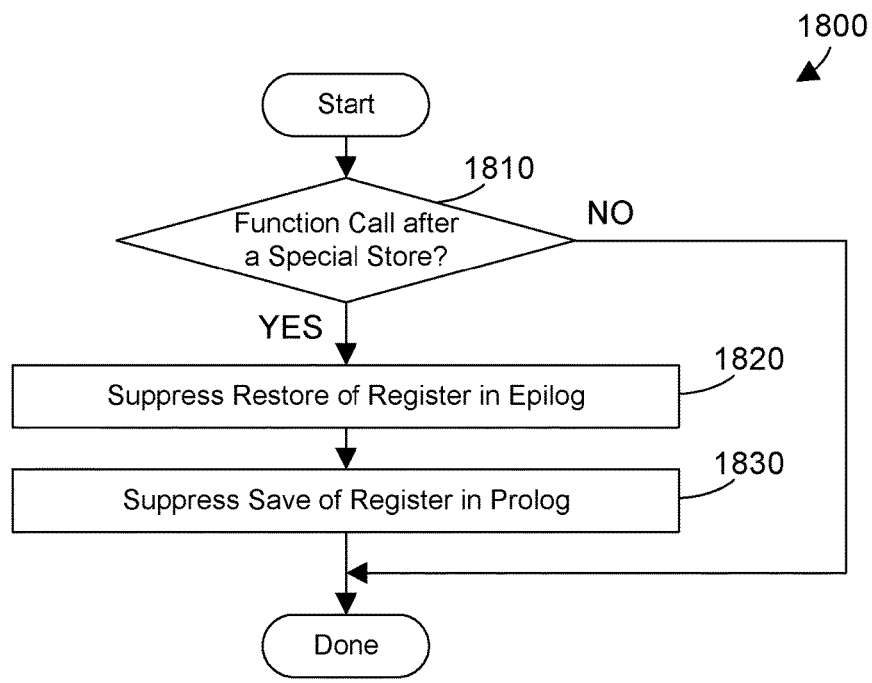
FIG. 18 is a flow diagram of a compiler method for handling special stores at function call boundaries.
FIG. 19 is a sample pseudo code snippet illustrating method 1800 in FIG. 18.

When a function call occurs, a stack frame is saved by the callee function as part of the prolog of the function. Thus, if there is a function call after a special store, it is possible that a register with an address tag is saved to the stack frame. This save will be a regular store, but the store address will be resolved to be in the stack frame, that is, different from the address tag for the tagged register. As a result, special processing is needed for special stores at function call boundaries. In such cases, the register will be saved to the address in the tag field. Referring to FIG. 18, method 1800 determines when there is a function call after a special store (step 1810=YES), in which case the restore of the register in the epilog is suppressed (step 1820) and in some cases, the save of the register in the prolog is suppressed (step 1830). A simple example in FIG. 19 illustrates this concept. Because of the load at 1910 in FIG. 19, the restore of R5 in the epilog is preferably suppressed due to this load. The restore of R5 in the epilog is also preferably suppressed because special store 1920 was executed before the function call. Because of the special store instruction at 1920 in FIG. 19, the compiler should avoid the save of R5 in the prolog in order to preserve the data of the special store in R5. The suppression of the save of R5 means that the compiler should consider R5 to be non-volatile and avoid using R5 for local variables inside the function. The suppression of restores and saves in steps 1820 and 1830 in FIG. 18 preserves the performance benefit of using special store instructions across function boundaries, while assuring correct operation when function calls are after special store instructions.

Another example that benefits from special store is the following code sequence that preserves the value in register R2 in the caller by saving R2 before a call to function foo and restoring the value upon returning:
Store R2, addr11
Indirect call to foo( )
Load R2, addr11
The above sequence can be converted to:
Spl.Store R2, add11
Indirect call to foo( )
Load R2, addr11
If R2 is not modified in the function foo( ), use of the special store instruction will provide the performance benefit of register promotion to the store of R2.

Figure 20:
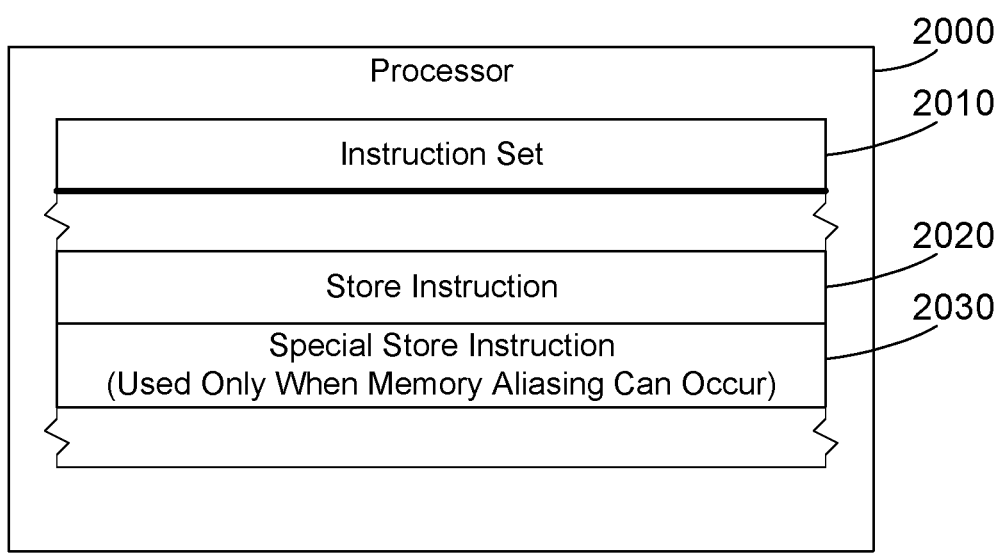
FIG. 20 is a block diagram of a processor that includes an instruction set that has a special store instruction that is only used when memory aliasing can occur.

The special store instruction is a new instruction that is not present in any known instruction sets. Referring to FIG. 20, a processor 2000 includes an instruction set 2010 that includes a regular store instruction 2020 and a special store instruction 2030. Processor 2000 is one suitable implementation for processor 600 in FIG. 6. In the most preferred implementation, the special store instruction is only used when memory aliasing can occur. Using a special store instruction when memory aliasing can occur allows a compiler to make register promotion optimizations, even when memory aliasing can occur. This is possible because the processor hardware automatically detects and handles memory aliasing in a way that assures correct operation.

Referring to FIG. 21, a computer system 2100 is one suitable implementation of a server computer system that includes a compiler with a memory aliasing optimization mechanism as described herein. Server computer system 2100 may be an IBM POWER8 computer system. However, those skilled in the art will appreciate that the disclosure herein applies equally to any computer system, regardless of whether the computer system is a complicated multi-user computing apparatus, a single user workstation, or an embedded control system. As shown in FIG. 21, computer system 2100 comprises one or more processors 2110, a main memory 2120, a mass storage interface 2130, a display interface 2140, and a network interface 2150. These system components are interconnected through the use of a system bus 2160. Mass storage interface 2130 is used to connect mass storage devices, such as local mass storage device 2155, to computer system 2100. One specific type of local mass storage device 2155 is a readable and writable CD-RW drive, which may store data to and read data from a CD-RW 2195.

Main memory 2120 preferably contains data 2121, an operating system 2122, source code 2123, an intermediate representation 2124, a compiler 2125, and machine code 2128. Data 2121 represents any data that serves as input to or output from any program in computer system 2100. Operating system 2122 is a multitasking operating system. There are three different representations of a computer program in FIG. 21, namely the high-level source code 2123, the intermediate representation 2124 that is generated by a front-end compiler from the source code 2123, and the machine code 2128 that is generated by a back-end compiler from the intermediate representation 2124. The compiler 2125 includes an optimizer 2126 that includes a memory aliasing optimization mechanism 2127. The optimizer 2126 and memory aliasing optimization mechanism 2127 disclosed herein could be implemented within a front-end compiler, or different aspects of the memory aliasing optimization mechanism 2127 could be implemented in both a front-end compiler and a back-end compiler. The compiler 2125 thus could represent either a front-end compiler or a full compiler that includes a front-end and a back-end. The memory aliasing optimization mechanism 2127 allows optimizing regions of code where memory aliasing may occur, as described in detail in the examples above. For example, the memory aliasing optimization mechanism 2127 could perform step 110 in FIG. 1, method 800 in FIG. 8, and method 1800 in FIG. 18.

Note the source code 2123, intermediate representation 2124, compiler 2125, and machine code 2128 are all shown residing in memory 2120 for the convenience of showing all of these elements in one drawing. One skilled in the art will appreciate that this is not the normal mode of operation for most compilers. A front-end compiler processes source code 2123 and generates therefrom intermediate representation 2124. This processing may occur on a computer system separate from computer system 2100. A back-end compiler processes intermediate representation 2124 and generates therefrom machine code 2128, which may also occur on a separate computer system. Compiler 2125 could be a front-end compiler, or could be a compiler that includes both a front end and a back end. In the extreme, source code 2123 could reside on a first computer system and a front-end compiler could reside on a second computer system. The front-end compiler could read the source code 2123 from the first computer system, generate the intermediate representation 2124, and store the intermediate representation 2124 on a third computer system. A back-end compiler could be executed on a fourth computer system, which reads the intermediate representation 2124 from the third computer system, and generates therefrom machine code 2128, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above. In addition, the memory aliasing optimization mechanism 2127 can include different portions implemented in different parts of the compiler.

Computer system 2100 utilizes well known virtual addressing mechanisms that allow the programs of computer system 2100 to behave as if they only have access to a large, contiguous address space instead of access to multiple, smaller storage entities such as main memory 2120 and local mass storage device 2155. Therefore, while data 2121, operating system 2122, source code 2123, intermediate representation 2124, compiler 2125, and machine code 2128 are shown to reside in main memory 2120, those skilled in the art will recognize that these items are not necessarily all completely contained in main memory 2120 at the same time. It should also be noted that the term "memory" is used herein generically to refer to the entire virtual memory of computer system 2100, and may include the virtual memory of other computer systems coupled to computer system 2100.

Processor 2110 may be constructed from one or more microprocessors and/or integrated circuits. Suitable examples of processor 2110 include processor 600 in FIG. 6 and processor 2000 in FIG. 20. Processor 2110 executes program instructions stored in main memory 2120. Main memory 2120 stores programs and data that processor 2110 may access. When computer system 2100 starts up, processor 2110 initially executes the program instructions that make up operating system 2122. Processor 2110 also executes the compiler 2125, and thus, the memory aliasing optimization mechanism 2127.

Although computer system 2100 is shown to contain only a single processor and a single system bus, those skilled in the art will appreciate that a compiler as described herein may be practiced using a computer system that has multiple processors and/or multiple buses. In addition, the interfaces that are used preferably each include separate, fully programmed microprocessors that are used to off-load compute-intensive processing from processor 2110. However, those skilled in the art will appreciate that these functions may be performed using I/O adapters as well.

Display interface 2140 is used to directly connect one or more displays 2165 to computer system 2100. These displays 2165, which may be non-intelligent (i.e., dumb) terminals or fully programmable workstations, are used to provide system administrators and users the ability to communicate with computer system 2100. Note, however, that while display interface 2140 is provided to support communication with one or more displays 2165, computer system 2100 does not necessarily require a display 2165, because all needed interaction with users and other processes may occur via network interface 2150.

Network interface 2150 is used to connect computer system 2100 to other computer systems or workstations 2175 via network 2170. Network interface 2150 broadly represents any suitable way to interconnect electronic devices, regardless of whether the network 2170 comprises present-day analog and/or digital techniques or via some networking mechanism of the future. Network interface 2150 preferably includes a combination of hardware and software that allows communicating on the network 2170. Software in the network interface 2150 preferably includes a communication manager that manages communication with other computer systems 2175 via network 2170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 2150.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 22, a method 2200 is preferably performed by a memory aliasing optimization mechanism in an optimizer in a compiler, such as memory aliasing optimization mechanism 2127 in optimizer 2126 in compiler 2125 shown in FIG. 21. A computer program is being compiled. Regions of the computer program where memory aliasing cannot occur are determined (step 2210). The compiler uses a regular store instruction for regions where memory aliasing cannot occur (step 2220). The compiler performs the usual register promotion optimizations (as known in the art) for regions where memory aliasing cannot occur (step 2230). Regions of the computer program where memory aliasing may occur are determined (step 2240). The compiler uses a special store instruction for regions where memory aliasing may occur (step 2250). In each region where special store instructions are used, a regular store instruction is inserted at the end of the region (step 2260). The compiler performs register promotion optimizations the regions where memory aliasing may occur (step 2270). Method 2200 is then done. Method 2200 illustrates that the compiler can perform the usual register promotion optimizations in regions of the computer program where memory aliasing cannot occur, while also performing register promotion optimizations in regions where memory aliasing may occur.

The claims and disclosure herein provide a processor that includes hardware that detects when memory aliasing occurs, and assures proper operation of the code even in the presence of memory aliasing. Because the hardware can detect and correct for memory aliasing, this allows a compiler to make optimizations such as register promotion even in regions of the code where memory aliasing can occur. The result is code that is more optimized and therefore runs faster.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, instead of having all processor registers with corresponding address tag fields, only a subset of registers may have corresponding address tag fields. This may be done to save area and/or cost. If only a subset of registers include corresponding address tag fields, only these registers can be specified in a special store instruction.

The invention claimed is:

1. A processor for executing software instructions, the processor comprising:
   instruction decode logic that recognizes a special store instruction that is used in regions of a computer program where memory aliasing can occur;
   a plurality of registers that each includes an address tag for storing an address, where data for a special store instruction is stored in a first of the plurality of registers and an address for the special store instruction is stored in an address tag corresponding to the first register;
   a load/store unit that includes logic for handling the special store instruction;
   load/store queues that include logic for ordering the special store instruction, wherein the load/store queues compare an address targeted by the special store instruction to at least one address previously forwarded to the load/store queues to determine when a younger load instruction is executed ahead of the special store instruction, wherein the load/store queues compare a target address of the younger special store instruction to the at least one address previously forwarded to the load/store queues to determine when the special store instruction is executed ahead of a load instruction targeting the address of the special store instruction;
   wherein the logic for handling the special store instruction in the load/store unit forwards the address of the special store instruction to the load/store queues without forwarding the data for the special store instruction to the load/store queues;
   when a younger load instruction targeting the address for the special store instruction executes before the special store instruction, the load/store unit flushes instructions in an instruction pipeline of the processor after the special store instruction; and
   when the younger special store instruction is executed ahead of a load instruction targeting the address of the special store instruction, the load/store unit flushes instructions in the instruction pipeline of the processor including the load instruction and instructions after the load instruction.

* * * * *